United States Patent
Shin et al.

(10) Patent No.: US 11,112,911 B2
(45) Date of Patent: Sep. 7, 2021

(54) DISPLAY DEVICE

(71) Applicant: LG Display Co., Ltd., Seoul (KR)

(72) Inventors: SeungHwan Shin, Jeonju-si (KR); Daeyoung Seo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 226 days.

(21) Appl. No.: 16/537,707

(22) Filed: Aug. 12, 2019

(65) Prior Publication Data

US 2020/0064967 A1 Feb. 27, 2020

(30) Foreign Application Priority Data

Aug. 22, 2018 (KR) .......... 10-2018-0097959

(51) Int. Cl.
*G06F 3/042* (2006.01)
*G02F 1/1333* (2006.01)

(52) U.S. Cl.
CPC ........ *G06F 3/0421* (2013.01); *G02F 1/13338* (2013.01); *G06F 3/0428* (2013.01)

(58) Field of Classification Search
CPC .... G06F 3/0421; G06F 3/0428; G06F 3/0416; G06F 3/042; G02F 1/13338; G02F 1/136286; G02F 1/1343; G02F 1/1362; G02F 1/1335; G02F 1/13312
See application file for complete search history.

(56) References Cited

U.S. PATENT DOCUMENTS

| | | | | |
|---|---|---|---|---|
| 9,671,637 B2 * | 6/2017 | Yeo | .......................... | G06F 3/042 |
| 9,766,754 B2 * | 9/2017 | McCartney | .......... | G02F 1/13338 |
| 10,079,326 B2 * | 9/2018 | Yeo | .................... | H01L 31/03765 |
| 10,134,800 B2 * | 11/2018 | Choo | ................ | H01L 27/14632 |
| 2010/0156847 A1 * | 6/2010 | No | ....................... | G06F 3/04164 |
| | | | | 345/175 |
| 2011/0147746 A1 * | 6/2011 | Kim | .................... | H01L 27/1222 |
| | | | | 257/59 |
| 2011/0157097 A1 * | 6/2011 | Hamada | .............. | G02F 1/13338 |
| | | | | 345/175 |
| 2013/0050148 A1 * | 2/2013 | Jeon | ........................ | G06F 3/042 |
| | | | | 345/175 |
| 2014/0015801 A1 * | 1/2014 | Chung | .................... | G06F 3/042 |
| | | | | 345/175 |
| 2014/0139489 A1 * | 5/2014 | Hwang | ................. | G06F 3/0412 |
| | | | | 345/175 |

* cited by examiner

*Primary Examiner* — Ricardo Osorio
(74) *Attorney, Agent, or Firm* — Polsinelli PC

(57) ABSTRACT

A display device according to an aspect of the present disclosure includes a lead-out line disposed between the data lines in the second direction, first and second photo touch sensors disposed in left and right pixels of the lead-out line and electrically connected to the lead-out line to transmit a touch sensing signal, first and second sensing data lines disposed in the second direction and applying first and second sensor data signals to the first and second photo touch sensors and first and second sensing gate lines disposed in the first direction and applying first and second sensor gate signals to the first and second photo touch sensors.

18 Claims, 12 Drawing Sheets

DISPLAY DEVICE

CROSS-REFERENCE TO RELATED APPLICATION

This application claims the priority of Korean Patent Application No. 10-2018-0097959 filed on Aug. 22, 2018, which is hereby incorporated by reference in its entirety.

BACKGROUND

Field of the Disclosure

The present disclosure relates to a display device, and more particularly, to a photo sensor type display device.

Description of the Background

In the information age, a display field for visually expressing electrical information signals has been rapidly developed, and accordingly, various display devices having excellent performance such as thinning, light weight, and low power consumption have been developed.

Examples of such a display device may include a liquid crystal display device (LCD), an organic light emitting display device (OLED), and the like.

Recently, the display device has a touch screen that allows a user to easily input information or commands intuitively and conveniently by deviating from a conventional input method such as a button, a keyboard, and a mouse.

The touch screen is a kind of input device which is installed in the display device and presses a touch sensor in the touch screen while the user views the display device to input predetermined information.

The touch screen may be classified into an add-on type, an on-cell type, and an in-cell type according to its structure, and among them, a touch screen integrated type display device is widely used because the display device can be thinned and improved in durability.

In the touch screen integrated type display device, as a touch sensor, a photo touch sensor that recognizes a touch according to light intensity and a capacitance touch sensor that recognizes a touch according to a capacitance variation are mainly used.

Particularly, the photo touch sensor recognizes a touch through a light leakage current of a phototransistor generated from incident light or reflected light by a touch object. At this time, in order to detect the sensing, sensing data of X/Y coordinates in the display panel is required. To this end, when the display and the sensing drive are divided by time division, the sensor node in the display panel needs to be read at one time due to the time division, there is disadvantage that one sensor node and one lead-out line must be matched at a ratio of 1:1. On the other hand, since a photo sensor method in which the sensing and the display timing are simultaneously performed requires sensing at the time of driving the display, the ripple of a common voltage due to the display signal, that is, the transition of the data signal is transmitted to the lead-out line and thus noise occurs.

The fluctuation amount of the common voltage generated when the display is driven is closely related to the charge amount of the noise according to Equation of $Q=CV$. That is, the intensity of the noise is proportional to a parasitic capacitance applied to the lead-out line, but the parasitic capacitance increases sharply with increasing inches and resolution, and thus there is a problem in sensing. Accordingly, there is a method of maximizing the charge amount of the sensor to increase a difference between the sensing value and the noise. However, the sensor storage capacitor has a side effect that affects an aperture ratio of the display panel.

SUMMARY

The present disclosure provides a display device which minimizes the decrease of an aperture ratio and maximally secures a storage capacity to minimize the influence of noise due to a change in data signal in a photo sensor type display device in which sensing and display timing are simultaneously performed.

The present disclosure provides a display device which minimizes the influence of noise due to a parasitic capacitor without any issue of luminous reflection.

The present disclosure is not limited to the above-mentioned objects, and other objects, which are not mentioned above, can be clearly understood by those skilled in the art from the following descriptions.

In order to achieve the aspects described above, according to an aspect of the present disclosure, the display device may include: a plurality of gate lines disposed in a first direction; a plurality of data lines disposed in a second direction different from the first direction to define a plurality of pixels together with the plurality of gate lines; a lead-out line disposed between the data lines in the second direction; first and second photo touch sensors disposed in left and right pixels of the lead-out line and electrically connected to the lead-out line to transmit a touch sensing signal; first and second sensing data lines disposed in the second direction and applying first and second sensor data signals to the first and second photo touch sensors; and first and second sensing gate lines disposed in the first direction and applying first and second sensor gate signals to the first and second photo touch sensors.

In order to solve the objects described above, according to another aspect of the present disclosure, the display device may include: a lead-out line disposed between data lines in one direction; first and second photo touch sensors electrically connected to the lead-out line at left and right sides of the lead-out line; first and second sensing data lines disposed in the one direction and applying first and second sensor data signals to the first and second photo touch sensors; and first and second sensing gate lines disposed in the other direction and applying first and second sensor gate signals to the first and second photo touch sensors, in which a charge stored in the first and second photo touch sensors may be transmitted to the lead-out line during one sensing timing.

Other detailed matters of the exemplary aspects are included in the detailed description and the drawings.

According to the present disclosure, it is advantageous in securing charging characteristics and in cost reduction by a simple touch circuit structure by simultaneously performing a display and a touch driving instead of a time division method by applying a photo sensor method.

According to the present disclosure, in the photo sensor type display device, it is advantageous to increase the inch and resolution of the display panel by minimizing the influence of noise due to a change in the data signal, and it is applicable to the DRD (Double Rate Driving) structure, thereby minimizing reduction in transmittance.

According to the present disclosure, it is possible to maximally secure a storage capacity while minimizing the decrease of the aperture ratio, and reduce the number of lead-out lines by 50%. According to the present disclosure, it is possible to minimize noise by adding common lines instead of reduced lead-out lines.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
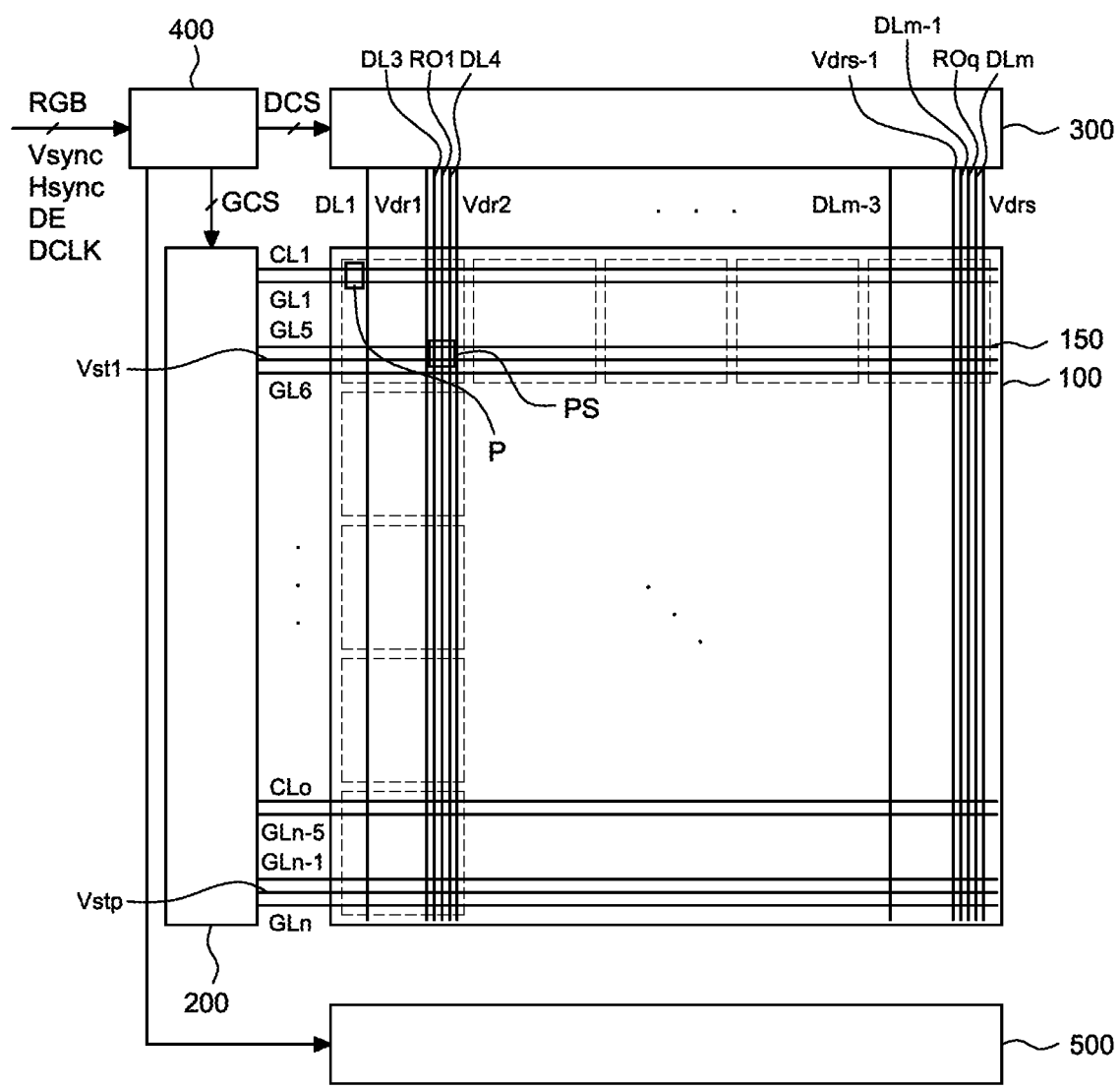
FIG. 1 is a block diagram illustrating a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Hereafter, various aspects of the present disclosure will be described in detail with reference to the accompanying drawings.

FIG. 1 is a block diagram illustrating a display device according to an exemplary aspect of the present disclosure.

Referring to FIG. 1, a display device according to an exemplary aspect of the present disclosure includes a display panel 100, a gate drive circuit 200, a data drive circuit 300, a timing controller 400, and a touch drive circuit 500.

In the display panel 100, gate lines GL1, ..., GLn-1, GLn and common lines CL1, ..., CLo are disposed in a first direction, and data lines DL1, ..., DLm-1, DLm may be disposed in a second direction different from the first direction.

Further, in the display panel 100, lead-out lines RO1, ..., ROq and sensing data lines Vdr1, Vdr2, ..., Vdrs-1, Vdrs are disposed in the second direction between the data lines DL1, ..., DLm-1, DLm. In addition, the sensing storage lines Vst1, ..., Vstp may be disposed in the first direction between the gate lines GL1, ..., GLn-1, GLn.

For example, a plurality of pixels P may be defined by crossing a plurality of gate lines GL1, ..., GLn-1, GLn and a plurality of data lines DL1, ..., DLm-1, DLm to each other.

The plurality of pixels P are electrically connected to the gate lines GL1, ..., GLn-1, GLn, the data lines DL1, ..., DLm-1, DLm, and the common lines CL1, ..., CLo. The plurality of pixels P may display an image by a pixel drive signal or a pixel drive voltage applied through the gate lines GL1, ..., GLn-1, GLn, the data lines DL1, ..., DLm-1, DLm, and the common lines CL1, ..., CLo.

The display panel 100 according to the exemplary aspect of the present disclosure may be configured by a double rate driving (DRD) structure in which a pair of pixels P disposed adjacent to each other is commonly connected to one of the data lines DL1, ..., DLm-1, DLm. However, the present disclosure is not limited thereto. For reference, the DRD structure is a method for implementing the same resolution by reducing the number of data lines by ½, instead of doubling the number of gate liens compared to a general display panel, and reducing the number of data integrated circuits (ICs) constituting the data drive circuit.

As such, the display panel 100 according to the exemplary aspect of the present disclosure has the DRD structure. In the display panel 100, the lead-out lines RO1, . . . , ROq and the sensing data lines Vdr1, Vdr2, . . . , Vdrs-1, Vdrs may be disposed using a partial region in which existing data lines DL1, . . . , DLm-1, DLm are disposed. In addition, a photo touch sensor PS is disposed in a partial region in which two of the gate lines GL1, . . . , GLn-1, GLn are adjacent to each other. Accordingly, the display panel 100 may include the photo touch sensor PS without reduction in aperture ratio as compared with a general display device.

The display panel 100 includes a plurality of pixels P and may display an image based on the gradation displayed by each pixel P. In the case of a liquid crystal panel as an example of the display panel 100, each of the plurality of pixels P may include a pixel electrode driven by a signal applied through the gate lines GL1, . . . , GLn-1, GLn and the data lines DL1, . . . , DLm-1, DLm and a common electrode driven through the common lines CL1, . . . , CLo. Each of the plurality of pixels P may display an image by tilting a liquid crystal by a voltage difference between the pixel electrode and the common electrode. However, the present disclosure is not limited to the liquid crystal panel.

The plurality of pixels P illustrated in FIG. 1 may be sub-pixels that display different colors, and a plurality of sub-pixels may constitute one pixel by unit. For example, the sub-pixels may display red, green, and blue, or red, green, blue, and white.

In the display panel 100, a plurality of sensor pixel units 150 may be defined.

The sensor pixel unit 150 may include a plurality of pixels.

The sensor pixel unit 150 may include a photo touch sensor PS that recognizes a touch according to a change in an off current of a sensor thin film transistor which varies depending on light intensity. More specifically, the photo touch sensor PS includes a sensor thin film transistor and a sensor storage capacitor, and the sensor thin film transistor is turned on according to the light intensity and then the sensor storage capacitor is charged with a voltage. Then, the charged voltage is outputted to the lead-out lines RO1, . . . , ROq at a predetermined timing to recognize the touch. The structure of the plurality of sensor pixel units 150 will be described in more detail with reference to the following drawings to be described below.

The gate drive circuit 200 may sequentially supply gate signals to the gate lines GL1, . . . , GLn-1, GLn of the display panel 100 in accordance with a gate drive control signal GCS transmitted from the timing controller 400. The gate drive circuit 200 may include a shift register, a level shifter, and the like.

The gate drive circuit 200 may be disposed independently of the display panel 100 or may be embedded on a non-active area of the display panel 100 in which the pixels P are not disposed by a gate-in-panel (GIP) method in a thin film form when a substrate of the display panel 100 is manufactured.

The data drive circuit 300 generates a sampling signal by a data drive control signal DCS transmitted from the timing controller 400 and latches image data inputted from the timing controller 400 according to the sampling signal to change the image data to a data signal, and then supply a data signal to the data lines DL1, . . . , DLm-1, DLm in response to a source output enable (SOE) signal.

The data drive circuit 300 may be connected to a bonding pad of the display panel 100 by a chip on glass (COG) method or directly disposed on the display panel 100, or may be integrated and disposed in the display panel 100 in some cases. Further, the data drive circuit 300 may be disposed in a chip on film (COF) method.

The timing controller 400 may transmit input image signals RGB received from a host system (not illustrated) to the data drive circuit 300.

Further, the timing controller 400 may generate a timing control signal for controlling the operation timings of the gate drive circuit 200 and the data drive circuit 300 using timing signals such as a clock signal DCLK, a horizontal synchronization signal Hsync, a vertical synchronization signal Vsync, and a data enable signal DE received together with the input video signal RGB. The timing controller 400 may generate a control signal GCS of the gate drive circuit 200 and a control signal DCS of the data drive circuit 300 in synchronization with the timing signal.

In addition, the timing controller 400 may generate a touch drive signal for driving the photo touch sensor PS and transmit the generated touch drive signal to the touch drive circuit 500. In addition, the timing controller 400 may receive a touch sensing signal from the touch drive circuit 500 and calculate touch information.

The touch drive circuit 500 may apply the touch drive signal transmitted from the timing controller 400 to the photo touch sensor PS. The touch drive circuit 500 may receive the touch sensing signal transmitted from the photo touch sensor PS to determine whether or not to be touched.

Figure 2:
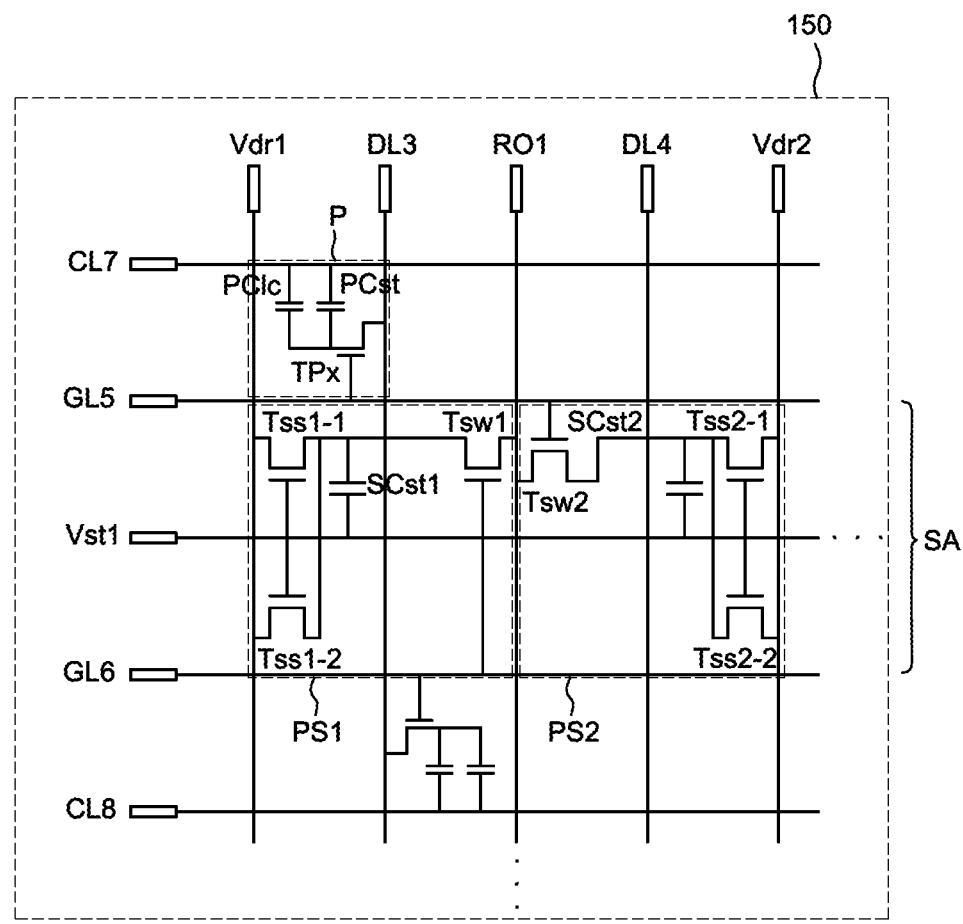
FIG. 2 is an equivalent circuit diagram illustrating a part of one sensor pixel unit disposed on a display panel according to the exemplary aspect of the present disclosure.

FIG. 2 is an equivalent circuit diagram illustrating a part of any one sensor pixel unit disposed on a display panel according to the exemplary aspect of the present disclosure.

Figure 3:
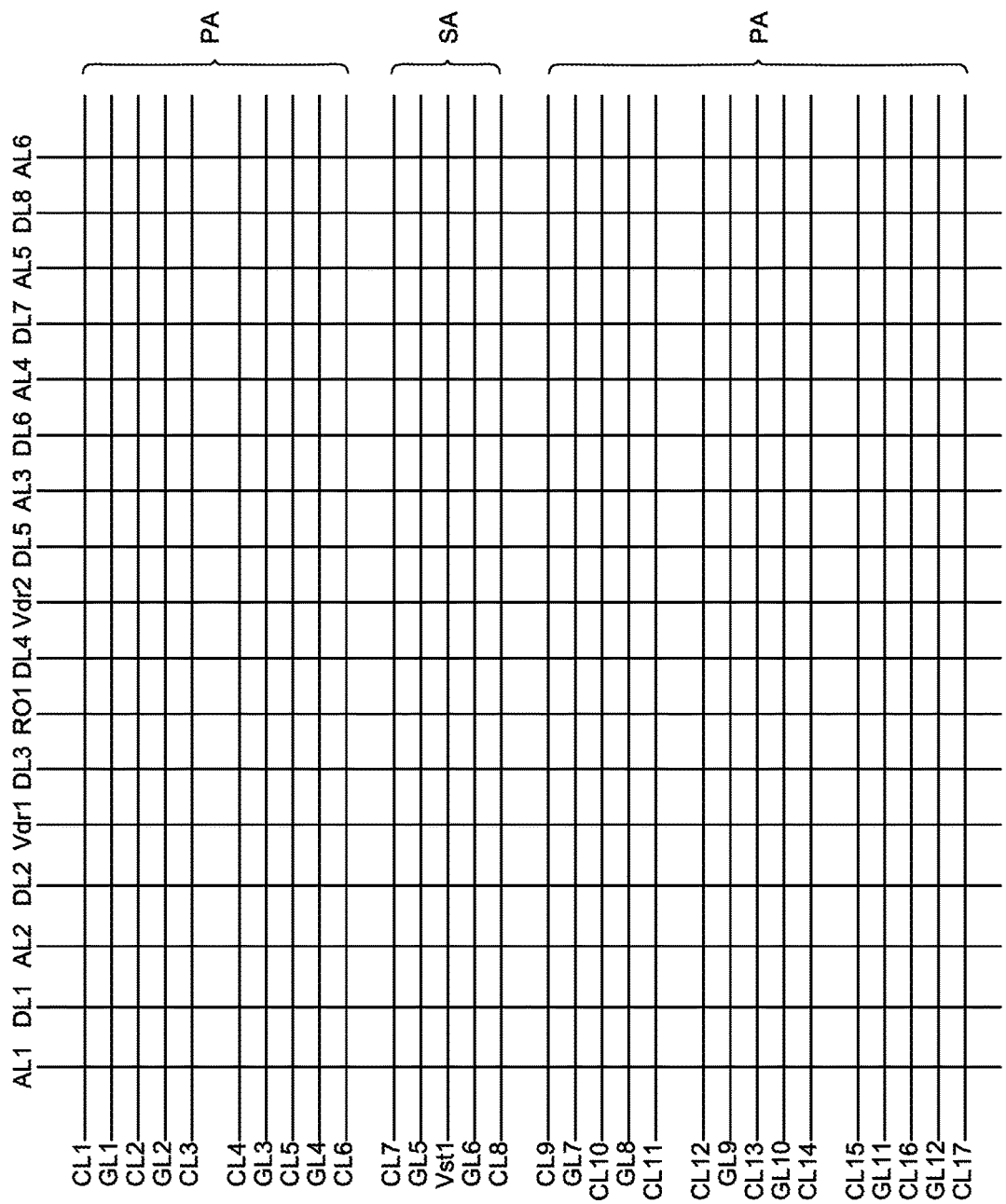
FIG. 3 is a diagram illustrating an example of displacement of lines in one sensor pixel unit.

FIG. 3 is a diagram illustrating an example of displacement of lines in one sensor pixel unit. FIG. 3 illustrates an example of one sensor pixel unit constituted by pixels of 18 dots □ 6 dots.

FIG. 2 illustrates an example of a part of the sensor pixel unit 150 having photo touch sensors PS1 and PS2.

Figure 4:
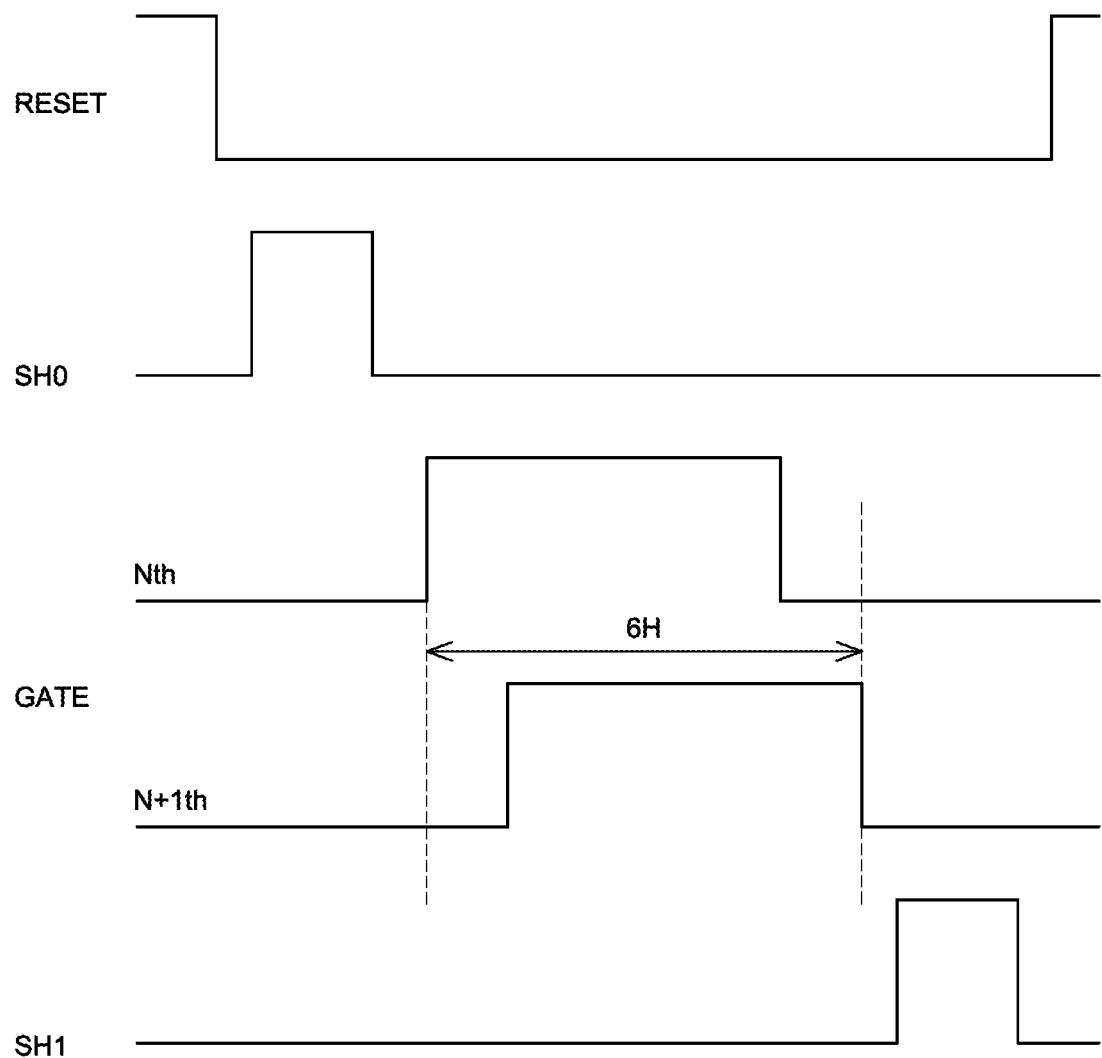
FIG. 4 is a waveform diagram for explaining driving of the display panel according to the exemplary aspect of the present disclosure.

FIG. 4 is a waveform diagram for explaining driving of the display panel according to the exemplary aspect of the present disclosure.

Figure 5:
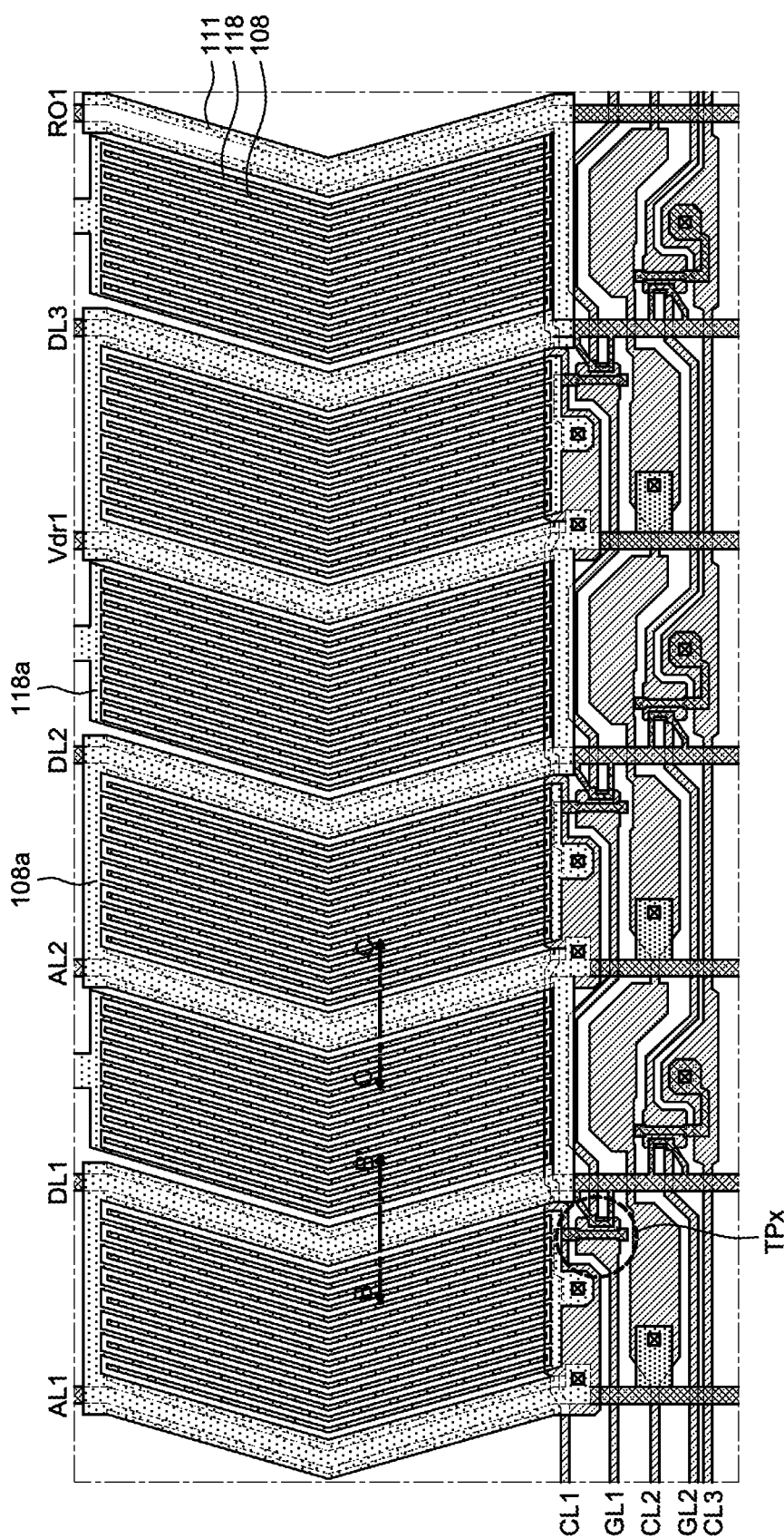
FIG. 5 is a plan view illustrating an example of a part of the sensor pixel unit.

FIG. 5 is a plan view illustrating an example of a part of the sensor pixel unit.

Figure 6:
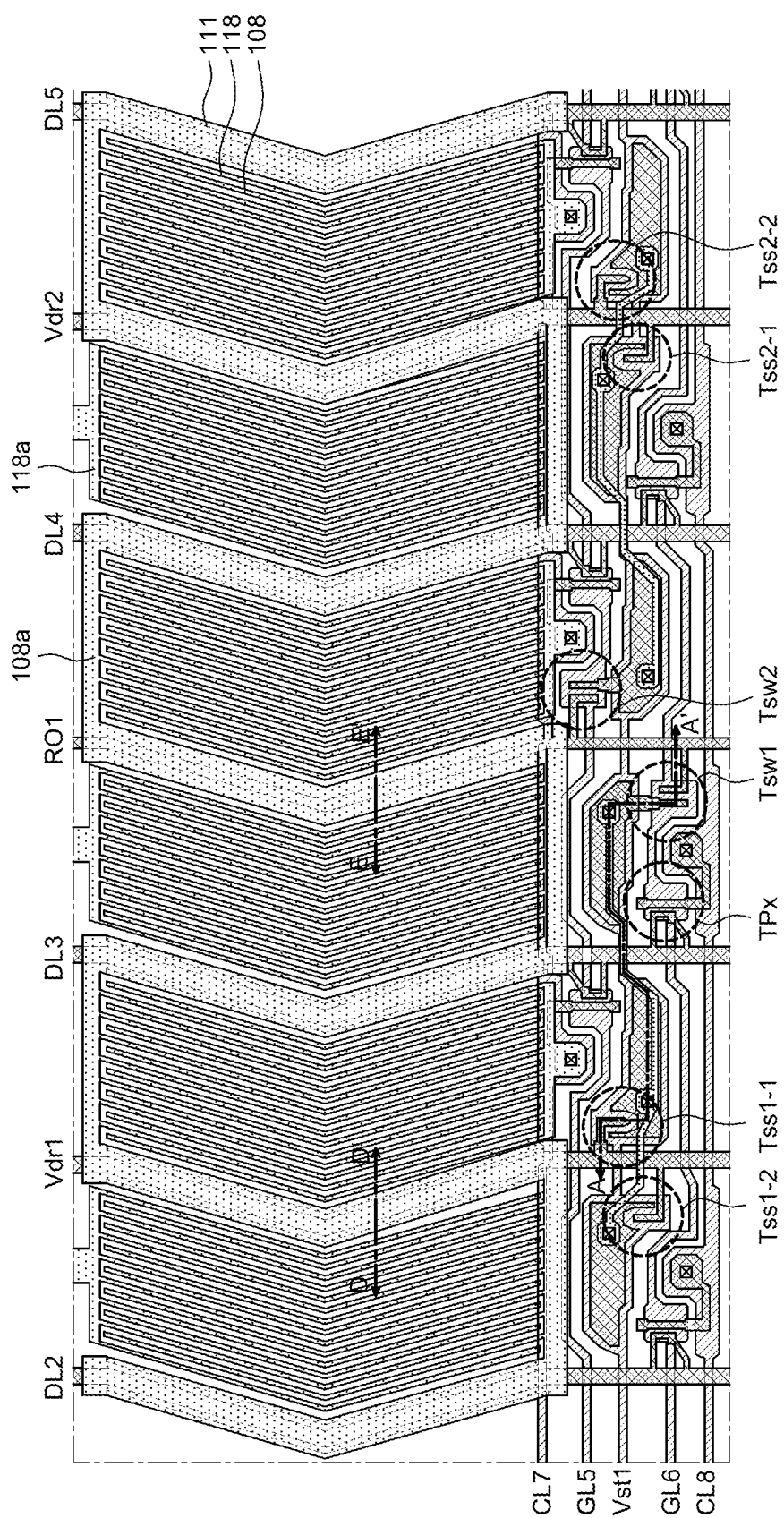
FIG. 6 is a plan view illustrating an example of another part of the sensor pixel unit.

FIG. 6 is a plan view illustrating an example of another part of the sensor pixel unit.

In this case, FIG. 5 illustrates an example of a pixel area in which a plurality of pixels is disposed to display an image, and FIG. 6 illustrates an example of a sensor area in which at least one pair of photo touch sensors are disposed to sense incident light and recognize a touch.

Referring to FIGS. 2 and 3, the sensor pixel unit 150 of the display panel according to the exemplary aspect of the present disclosure may include a pixel area PA in which a plurality of pixels P are disposed to display an image, and a sensor area SA in which at least one pair of photo touch sensors PS1 and PS2 are disposed to sense the incident light and recognize the touch.

A plurality of pixels P may be disposed in the pixel area PA and the plurality of pixels P may be sub-pixels of red, green and blue, respectively.

The plurality of pixels P may be disposed in a double rate driving (DRD) method. More specifically, among the plurality of pixels P, adjacent pixels P, for example, a first pixel and a second pixel are electrically connected to the first data line DL1, which is the same data line, and may be connected to different gate lines, for example, a first gate line GL1 and a second gate line GL2, respectively.

As such, due to the DRD structure, one horizontal common line CL1, CL2, CL3, CL4, CL5, CL6, CL9, CL10, CL11, CL12, CL13, CL14, CL15, CL16, or CL17 is disposed every two pixels P and vertical common lines AL1, AL2, AL3, AL4, AL5, and AL6 are disposed in addition to the sensor lines (that is, the sensing data lines Vdr1, Vdr2 and the lead-out line RO1), thereby drastically reducing a total resistance of the common lines.

The pixel area PA of the sensor pixel unit 150 may include horizontal common lines CL1, CL2, CL3, CL4, CL5, CL6, CL9, CL10, CL11, CL12, CL13, CL14, CL15, CL16, and CL17 disposed in the first direction and gate lines GL1, GL2, GL3, GL4, GL7, GL8, GL9, GL10, GL11, and GL12 disposed between the horizontal common lines CL1, CL2, CL3, CL4, CL5, CL6, CL9, CL10, CL11, CL12, CL13, CL14, CL15, CL16, and CL17. Further, the sensor area SA may include the horizontal common lines CL7 and CL8 disposed in the first direction and sensing gate lines GL5 and GL6 and a sensing storage line Vst1 disposed between the horizontal common lines CL7 and CL8.

The pixel area PA may include data lines DL1, DL2, DL3, DL4, DL5, DL6, DL7, and DL8 disposed in a second direction different from the first direction, and the vertical common lines AL1, AL2, AL3, AL4, AL5 and AL6, the sensing data lines Vdr1 and Vdr2, and the lead-out line RO1 disposed between the data lines DL1, DL2, DL3, DL4, DL5, DL6, DL7, and DL8.

The lines of the pixel area PA disposed in the second direction may be extended to the sensor area SA. The sensing data lines Vdr1 and Vdr2 are lines for transmitting a sensor data signal, that is, a photo touch sensor drive signal, to the photo touch sensors PS1 and PS2 disposed in the sensor area SA.

Referring to FIG. 2, each of the plurality of pixels P may include a pixel thin film transistor TPx, a pixel capacitor PClc connected in parallel with the pixel thin film transistor TPx, and a pixel storage capacitor PCst.

Although not illustrated, each pixel P may be configured by a pixel electrode connected to the pixel thin film transistor TPx, a common electrode for supplying a common voltage, and a liquid crystal layer in which liquid crystals tilted by a vertical electric field or a horizontal electric field by the pixel electrode and the common electrode are disposed.

The pixel thin film transistor TPx may store data signal applied form the data lines DL1, DL2, DL3, DL4, DL5, DL6, DL7, and DL8 in response to gate signals applied from the corresponding gate lines GL1, GL2, GL3, GL4, GL7, GL8, GL9, GL10, GL11, GL12 in the pixel capacitor PClc and the pixel storage capacitor PCst.

The liquid crystal may be driven according to the data signal stored in the pixel capacitor PClc, and the pixel storage capacitor PCst may stably maintain the data signal of the pixel capacitor PClc.

In this case, a case where the display panel 100 according to the exemplary aspect of the present disclosure is a liquid crystal panel has been described as an example, but the present disclosure is not limited thereto. For example, the display panel 100 according to the exemplary aspect of the present disclosure may be an organic light emitting display panel, and in the case of the organic light emitting display panel, an anode connected to the pixel thin film transistor Px, a light emitting layer made of organic material, and a cathode may be included.

As described above, according to the exemplary aspect of the present disclosure, in the photo sensor type display device in which sensing and display timing are simultaneously performed, the photo touch sensors PS1 and PS2 are provided on both sides of the lead-out line RO1 to transfer the charges stored in the two photo touch sensors PS1 and PS2 to the lead-out line RO1 during one sensing timing. According to the exemplary aspect of the present disclosure, it is advantageous in securing charging characteristics and in cost reduction by a simple touch circuit structure by simultaneously performing a display and a touch driving instead of a time division method by applying a photo sensor method.

The lead-out line RO1 is disposed in the second direction between the third and fourth data lines DL3 and DL4 and the lead-out line RO1 may transmit a touch sensing signal by the first and second photo touch sensors PS1 and PS2.

The first and second sensing data lines Vdr1 and Vdr2 may be disposed on the other sides of the third and fourth data lines DL3 and DL4 on which the lead-out line RO1 is not disposed.

On the other hand, an operating amplifier is connected to the lead-out line RO1 to detect an output voltage. For reference, a general operating amplifier means a high gain amplifier for an analog computer. In the analog computer, an amplifier having a large gain, a high input impedance, and a low output impedance is required so that the gain may be large so as to be determined only by characteristics of a passive element used in a feedback circuit. This amplifier is then widely used as a standard integrated circuit (IC) for the analog amplifier. The operating amplifier as the standard IC is a differential input type, in which a gain is 30 to 100 dB, and an amplifying circuit with an appropriate gain is obtained by applying a negative feedback thereto. The input/output characteristics of the circuit are determined by a ratio of the impedance connected to the input of the operating amplifier and the impedance connected to the feedback circuit.

The operating amplifier may be disposed in touch control ICs of the data drive circuit 300 and the touch drive circuit 500.

The touch control IC amplifies and detects the current sensed through the lead-out line RO1 by the operating amplifier. For example, the lead-out line RO1 is connected to a negative (−) input terminal and a reference voltage Vref may be applied to a positive (+) input terminal. The voltage output from the output terminal is an amplifying value of the sensed voltage value. Here, a feedback capacitor may be formed between the negative (−) input terminal and the output terminal. However, the present disclosure is not limited thereto.

Conventionally, the ripple of the common voltage due to the transition of the data signal causes voltage ripple in the lead-out line due to the capacitance of the parasitic capacitor to generate the noise. This causes deterioration of the characteristics of the touch sensor and a reduction in a margin of the voltage level for the touch sensor. That is, as an example, when the noise value is larger than the touch sensing signal, the output voltage detected by the operating amplifier may not be discriminated from a noise value or a sensing voltage, thereby deteriorating the accuracy of the sensing.

In order to solve this problem, according to the present disclosure, the photo touch sensors PS1 and PS2 are provided on both sides of the lead-out line RO1, so that the charges stored in the two photo touch sensors PS1 and PS2 are transmitted to the lead-out line RO1 during one sensing timing.

According to the exemplary aspect of the present disclosure, it is advantageous to increase the inch and resolution of the display panel by minimizing the influence of noise due to a change in the data signal, and it is applicable to the double rate driving (DRD) structure, thereby minimizing reduction in transmittance.

The first photo touch sensor PS1 according to the exemplary aspect of the present disclosure includes a pair of first sensor thin film transistors Tss1-1 and Tss1-2 and a first sensor storage capacitor SCst1. The first sensor thin film transistors Tss1-1 and Tss1-2 may be turned on according to the light intensity to charge the voltage in the first sensor storage capacitor SCst1. Then, the charged voltage may be output to the lead-out line RO1 at a predetermined timing by a first sensor switch thin film transistor Tsw1.

A case where the pair of first sensor thin film transistors Tss1-1 and Tss1-2 are connected to one first sensor storage capacitor SCst1 is described as an example, but the present disclosure is not limited thereto.

Further, the second photo touch sensor PS2 according to the exemplary aspect of the present disclosure includes a pair of second sensor thin film transistors Tss2-1 and Tss2-2 and a second sensor storage capacitor SCst2. The second sensor thin film transistors Tss2-1 and Tss2-2 may be turned on according to the light intensity to charge the voltage in the second sensor storage capacitor SCst2. Then, the charged voltage may be output to the same lead-out line RO1 at a predetermined timing by a second sensor switch thin film transistor Tsw2.

A case where the pair of second sensor thin film transistors Tss2-1 and Tss2-2 are connected to one second sensor storage capacitor SCst2 is described as an example, but the present disclosure is not limited thereto.

That is, for example, the sensor storage capacitor needs a capacity of about 1.2 pf or more for application to a 65-inch UHD. However, in terms of an aperture ratio, when the capacitance of the capacitor increases by 0.2 pf, the aperture ratio is reduced by 10% or more. Therefore, it is necessary to maximally secure the storage capacity while minimizing the decrease in the aperture ratio.

For example, in the case of one of the first and second sensor thin film transistors Tss1-1, Tss1-2, Tss2-1, and Tss2-2, full charge is possible up to about 0.6 pf at a width/distance (W/L)=25/4.8 □m level in a reference of 60 Hz and 1 frame=16.6 ms.

As a result, according to the exemplary aspect of the present disclosure, when the capacitance of one of the first and second photo touch sensors PS1 and PS2 is 0.6 pf level, in order to secure the capacitance of 1.2 pf as described above, the charge stored in the first and second photo touch sensors PS1 and PS2 is added and transmitted to the lead-out line RO1 during one sensing timing. Therefore, according to the present disclosure, it is possible to maximally secure the storage capacity while minimizing the decrease of the aperture ratio.

That is, in the present disclosure, two gate lines, for example, the sixth sensing gate line GL6 and the fifth sensing gate line GL5 are connected to the first photo touch sensor PS1 and the second photo touch sensor PS2, respectively. Meanwhile, the capacitance of each of the first and second photo touch sensors PS1 and PS2 is designed to be about 0.6 pf. A pair of first sensor thin film transistors Tss1-1 and Tss1-2 and a pair of second sensor thin film transistors Tss2-1 and Tss2-2 are disposed in each of the first photo touch sensor PS1 and the second photo touch sensor PS2.

Meanwhile, considering a wavelength range of a light source, the pair of first sensor thin film transistors Tss1-1 and Tss1-2 according to the present disclosure may be constituted by a first red sensor thin film transistor Tss1-1 responding in a red light source and a first green sensor thin film transistor Tss1-2 responding in a green light source.

In addition, the pair of second sensor thin film transistors Tss2-1 and Tss2-2 may be constituted by a second red sensor thin film transistor Tss2-1 responding in a red light source and a second green sensor thin film transistor Tss2-2 responding in a green light source. However, the present disclosure is not limited thereto.

According to the present disclosure, the first red sensor thin film transistor Tss1-1 and the first green sensor thin film transistor Tss1-2 are connected to the same first sensing data line Vdr1, and the second red sensor thin film transistor Tss2-1 and the second green sensor thin film transistor Tss2-2 are connected to the same second sensing data line Vdr2. In this case, the number of the lead-out lines RO1 may be reduced by 50%, so that the number of integrated circuits may be reduced and the cost may be reduced. Further, according to the present disclosure, it is possible to minimize noise by adding vertical common lines instead of reduced lead-out lines RO1.

Referring to FIG. 4, at the timing of the sensor, the charge moves to the lead-out line at the instant when a gate high voltage Vgh is applied to two gate lines (GATE; Nth, N+1th) and the gate is opened.

The gate high voltage Vgh is applied to a Nth gate line (GATE; Nth) during 5 H, and after 1 H, the gate high voltage Vgh is applied to an N+1th gate line (GATE; N+1th) during 5 H and thus the gate is opened during a total of 6 H.

At an SH0 timing, a reference charge amount of the lead-out line is measured, and then the gate high voltage Vgh is sequentially applied to the two gate lines (GATE; Nth, N+1th).

At an SH1 timing, a charge amount accumulated in the sensor storage capacitor transmitted through the lead-out line is measured and compared with the reference charge amount.

When the Nth gate line (GATE; Nth) is turned on, the charge stored in the first sensor storage capacitor of the first photo touch sensor located on the right side of the drive processor moves to the lead-out line through the first sensor switch thin film transistor. Further, when the N+1th gate line (GATE; N+1th) is turned on, the charge stored in the second sensor storage capacitor of the second photo touch sensor located on the left side of the drive processor moves to the same lead-out line through the second sensor switch thin film transistor. Thereafter, after the two gate lines (GATE; Nth, N+1th) are turned off, the charge amount is sensed in the lead-out line at the SH1 timing.

Next, referring to FIGS. 5 and 6, each pixel includes an opening area for displaying an image by the pixel electrode 118 and the common electrode 108, and a non-opening area without displaying the image in which a drive element for driving the pixel electrode 118 and the common electrode 108 in the opening area, for example, a pixel thin film transistor TPx, and the like are disposed.

The pixel electrode 118 and the common electrode 108 may be disposed in the opening area.

The pixel electrode 118 forms an electric field together with the common electrode 108, and liquid crystal molecules of the liquid crystal layer are tilted by the electric field formed above to display an image. The pixel electrodes 118 may be disposed at equal intervals and one ends of the plurality of pixel electrodes 118 may be connected to pixel lines 118a disposed in the first direction. The pixel electrodes 118 may be disposed not only in the opening area, but also extended and disposed even in the non-opening area.

The common electrodes 108 may be disposed at equal intervals in parallel and one ends of the plurality of common electrodes 108 may be connected to common lines 108a disposed in the first direction. The common electrodes 108 may be alternately disposed with the pixel electrodes 118 in the opening area.

In addition, the pixel lines 118a and the common lines 108a may be disposed alternately at the upper portion and the lower portion of the pixels.

Further, the common electrodes 108 may be disposed on the data lines DL1, DL2, DL3, DL4, and DL5, the sensing data lines Vdr1 and Vdr2, and the vertical common lines AL1 and AL2 so as to cover the data lines DL1, DL2, DL3, DL4, and DL5, the sensing data lines Vdr1 and Vdr2, and the vertical common lines AL1 and AL2.

In this case, according to the exemplary aspect of the present disclosure, the common electrode 108 is opened (or, is not provided) at the upper portion of the lead-out line RO1. This is because a reference voltage of the lead-out line RO1 has the same potential as the voltage of the common electrode 108, so that even if the reference voltage is removed, the parasitic capacitance may be reduced without affecting the display.

On the other hand, the non-opening area may include a plurality of gate lines GL1 and GL2, a plurality of data lines DL1, DL2, DL3, DL4 and DL5, horizontal common lines CL1, CL2, CL3, CL7 and CL8, vertical common lines AL1 and AL2, sensing data lines Vdr1 and Vdr2, a lead-out line RO1, a sensing storage line Vst1, sensing gate lines GL5 and GL6, a pixel thin film transistor TPx, sensor thin film transistors Tss1-1, Tss1-2, Tss2-1, and Tss2-2, sensor switch thin film transistors Tsw1 and Tsw2, and first and second sensor storage capacitors. Here, a case where the sensing gate lines GL5 and GL6 are constituted by conventional gate lines is described as an example, but the present disclosure is not limited thereto, and the sensing gate lines GL5 and GL6 may be constituted by different lines from the conventional gate lines. However, when the sensing gate lines GL5 and GL6 are constituted by different lines from the conventional gate lines, an aperture ratio loss may occur. Accordingly, in order to minimize the reduction of the aperture ratio in the first direction of the display device, the sensing gate lines GL5 and GL6 may be constituted by the conventional gate lines.

The sensing storage line Vst1, the sensing gate lines GL5 and GL6, the sensor thin film transistors Tss1-1, Tss1-2, Tss2-1, and Tss2-2, the sensor switch thin film transistors Tsw1 and Tsw2, and the first and second sensor storage capacitors are disposed only in the sensor area, and the configuration will be described below in detail. Here, a shielding line 111 for shielding light may be disposed on at least one side of the data lines DL1, DL2, DL3, DL4 and DL5 disposed in the second direction and the sensing data lines Vdr1 and Vdr2 so as to cover each line. At this time, according to the exemplary aspect of the present disclosure, the shielding line 111 is not disposed on one side of the lead-out line RO1 and the vertical common lines AL1 and AL2. This is to reduce a load of the lead-out line RO1, and the common electrode 108 at the upper portion of the lead-out line RO1 is opened (or, is not provided) and simultaneously, the shielding line 111 on the side is removed.

As such, the vertical common lines AL1 and AL2, the sensing data lines Vdr1 and Vdr2, and the lead-out line RO1 disposed in the second direction are not disposed in a separate area, but may be disposed in an area where the data lines are disposed in a general display device (having no DRD method). Accordingly, in the display panel according to the exemplary aspect of the present disclosure, it is not necessary to design a separate line area in order to dispose a photo touch sensor. Therefore, the decrease in the aperture ratio may be minimized.

That is, in the display device according to the exemplary aspect of the present disclosure, since the pixels are configured by the DRD method, it is not required to provide a separate area where the vertical common lines AL1 and AL2, the sensing data lines Vdr1 and Vdr2, and the lead-out line RO1 are disposed. Accordingly, as compared with a case where a photo touch sensor is provided in a general display device (not a DRD method), it is possible to minimize the reduction of the aperture ratio in the second direction. In particular, in the case of the present disclosure, the number of the lead-out lines RO1 may be reduced by 50% by connecting the first and second photo touch sensors to the lead-out lines RO1, and it is possible to minimize noise by adding the vertical common lines AL1 and AL2 instead of the reduced lead-out lines RO1.

The pixel thin film transistor TPx may be configured by including the gate lines GL1 and GL2 or the sensing gate lines GL5 and GL6 as a gate electrode, the data lines DL1, DL2, DL3, DL4, and DL5, a source electrode branched from the data lines DL1, DL2, DL3, DL4, and DL5, and a drain electrode spaced apart from the source electrode.

The sensing data lines Vdr1 and Vdr2 may be disposed between the data lines DL1, DL2, DL3, DL4, and DL5, and may be connected with the sensor thin film transistors Tss1-1, Tss1-2, Tss2-1, and Tss2-2 to apply a sensor drive signal or a sensor drive voltage to the sensor thin film transistors Tss1-1, Tss1-2, Tss2-1, and Tss2-2. The sensor drive voltage applied to the sensor thin film transistors Tss1-1, Tss1-2, Tss2-1, and Tss2-2 may be applied from the touch drive circuit or from the timing controller.

The lead-out line RO1 may be electrically connected to the first sensor switch thin film transistor Tsw1 of the first photo touch sensor and electrically connected to the second sensor switch thin film transistor Tsw2 of the second photo touch sensor. Accordingly, the lead-out line RO1 may transmit a touch sensing signal to the touch drive circuit by the first and second photo touch sensors. The lead-out line RO1 may be disposed to correspond to the sensor pixel unit one to one.

The sensor thin film transistors Tss1-1, Tss1-2, Tss2-1, and Tss2-2 may be configured by including a gate electrode, sensing data lines Vdr1 and Vdr2, a source electrode branched from the sensing data lines Vdr1 and Vdr2, and a drain electrode spaced apart from the source electrode.

As described above, considering a wavelength range of a light source, the pair of first sensor thin film transistors Tss1-1 and Tss1-2 according to the present disclosure may be constituted by a first red sensor thin film transistor Tss1-1 responding in a red light source and a first green sensor thin film transistor Tss1-2 responding in a green light source.

In addition, the pair of second sensor thin film transistors Tss2-1 and Tss2-2 may be constituted by a second red sensor thin film transistor Tss2-1 responding in a red light source and a second green sensor thin film transistor Tss2-2 responding in a green light source. However, the present disclosure is not limited thereto.

According to the present disclosure, the first red sensor thin film transistor Tss1-1 and the first green sensor thin film transistor Tss1-2 are connected to the same first sensing data line Vdr1, and the second red sensor thin film transistor Tss2-1 and the second green sensor thin film transistor Tss2-2 are connected to the same second sensing data line Vdr2. However, the present disclosure is not limited thereto.

The sensor switch thin film transistors Tsw1 and Tsw2 may include a gate electrode, a lead-out line RO1, a drain electrode branched from the lead-out line RO1, and a source electrode spaced apart from the drain electrode.

For reference, FIGS. 5 and 6 illustrate displacement of pixels (RGB units) of 6 dots×6 dots on the basis of a 65-inch UHD. A BM CD in the non-opening area is increased according to the displacement of the sensor storage capacitor and the BM CD may be designed to be the same for all the pixels in order to solve the visibility degradation due to the aperture ratio deviation.

In addition, a total of three horizontal common lines CL1, CL2, CL3, CL7 and CL8 are formed in one BM area, thereby reducing the resistance of the common line by about 60% compared with the related art. At this time, it can be seen that in the sensor area where the photo touch sensor is disposed, the sensing storage line Vst1 is disposed in the center instead of the horizontal common lines CL1, CL2, CL3, CL7, and CL8.

A cross-sectional structure of the opening area of the display panel configured as above will be described in more detail.

Figure 7:
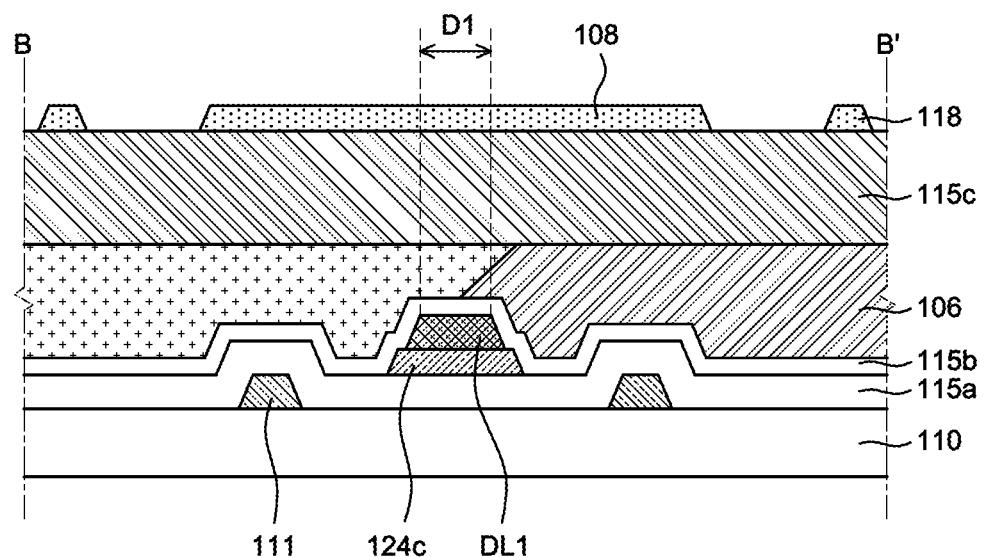
FIG. 7 is a cross-sectional view of the sensor pixel unit illustrated in FIG. 5 taken along line B-B'.

FIG. 7 is a cross-sectional view of the sensor pixel unit illustrated in FIG. 5 taken along line B-B'.

Figure 8:
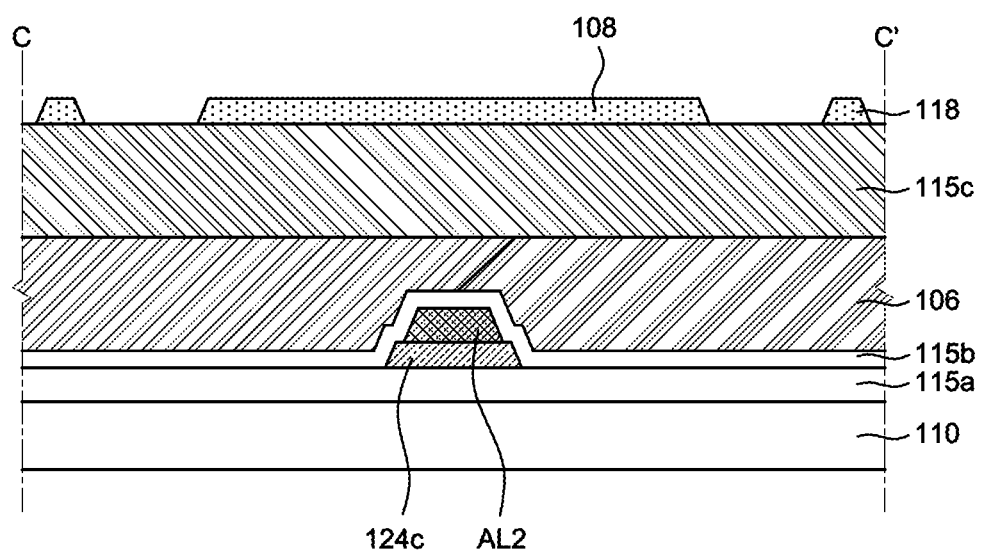
FIG. 8 is a cross-sectional view of the sensor pixel unit illustrated in FIG. 5 taken along line C-C'.

FIG. 8 is a cross-sectional view of the sensor pixel unit illustrated in FIG. 5 taken along line C-C'.

Figure 9:
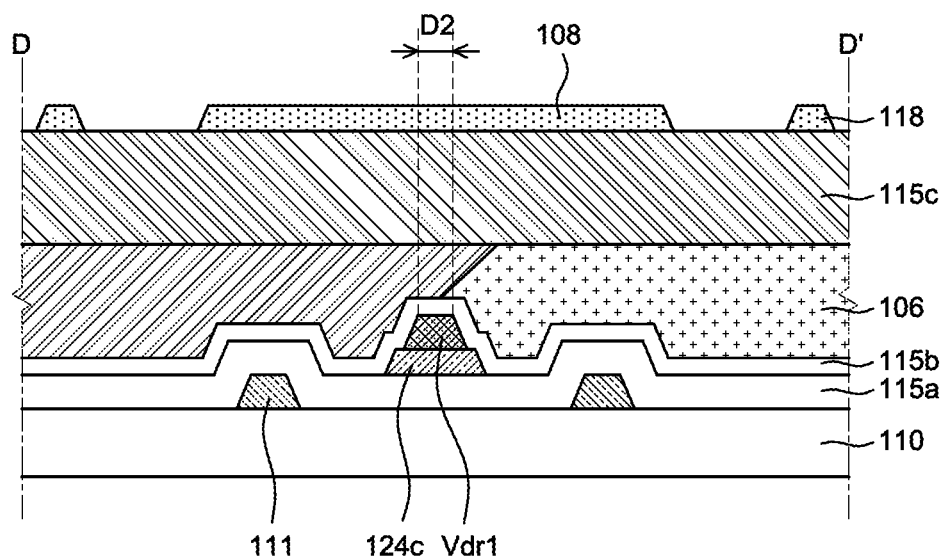
FIG. 9 is a cross-sectional view of the sensor pixel unit illustrated in FIG. 6 taken along line D-D'.

FIG. 9 is a cross-sectional view of the sensor pixel unit illustrated in FIG. 6 taken along line D-D'.

Figure 10:
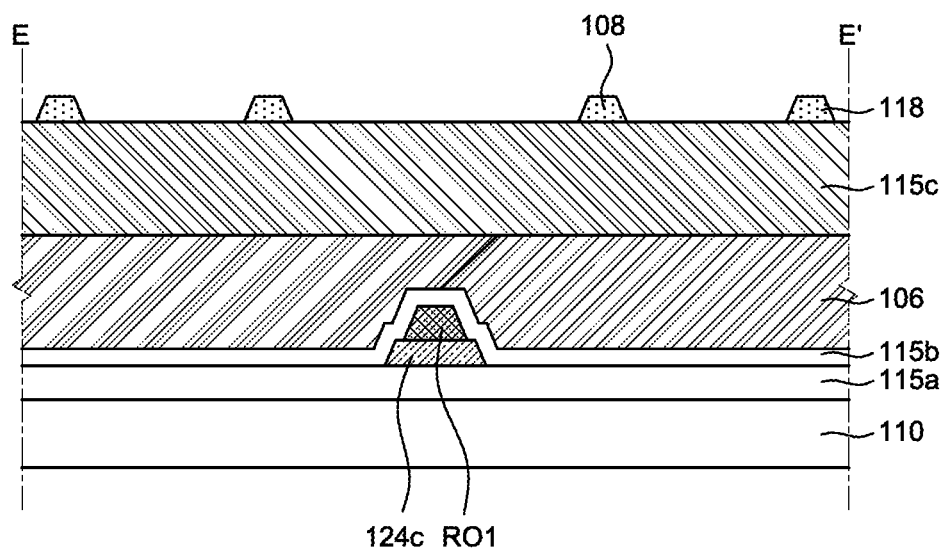
FIG. 10 is a cross-sectional view of the sensor pixel unit illustrated in FIG. 6 taken along line E-E'.

FIG. 10 is a cross-sectional view of the sensor pixel unit illustrated in FIG. 6 taken along line E-E'.

FIG. 7 illustrates an example of a cross-sectional structure adjacent to a data line, and FIG. 8 illustrates an example of a cross-sectional structure adjacent to a vertical common line. In addition, FIG. 9 illustrates an example of a cross-sectional structure adjacent to a sensing data line, and FIG. 10 illustrates an example of a cross-sectional structure adjacent to a lead-out line. FIGS. 7 to 10 have substantially the same configuration except for the presence of the shielding line, openness of the common electrode, and a critical dimension (CD) of the line.

Referring to FIGS. 7 to 10, a shielding line 111 may be disposed on a substrate 110.

The shielding line 111 may be disposed, for example, on at least one side of the data line DL1 and the sensing data line Vdr1. That is, the shielding line 111 may not be disposed on at least one side of the vertical common line AL2 and the lead-out line R01. However, the present disclosure is not limited thereto.

The shielding line 111 may be made of any one selected from the group consisting of, for example, molybdenum (Mo), aluminum (Al), chromium (Cr), gold (Au), titanium (Ti), nickel (Ni), neodymium (Nd), and copper (Cu) or an alloy thereof.

A gate insulating film 115a may be disposed on the shielding line 111. The gate insulating film 115a may be formed of, for example, a silicon oxide film (SiOx), a silicon nitride film (SiNx), or a multilayered structure thereof.

A semiconductor layer 124c may be disposed on the gate insulating film 115a.

The semiconductor layer 124c may be formed of any one of semiconductor materials such as amorphous silicon, polycrystalline silicon, low-temperature polysilicon, and an oxide semiconductor.

The data line DL1, the vertical common line AL2, the sensing data line Vdr1, and the lead-out line RO1 may be disposed on the semiconductor layer 124c.

The data line DL1, the vertical common line AL2, the sensing data line Vdr1, and the lead-out line RO1 may be made of any one selected from the group consisting of, for example, molybdenum (Mo), aluminum (Al), chromium (Cr), gold (Au), titanium (Ti), nickel (Ni), neodymium (Nd), and copper (Cu) or an alloy thereof.

An interlayer insulating film 115b may be disposed on the data line DL1, the vertical common line AL2, the sensing data line Vdr1, and the lead-out line RO1.

The interlayer insulating film 115b is to insulate components of an upper layer from the data line DL1, the vertical common line AL2, the sensing data line Vdr1, and the lead-out line RO1, and may be made of, for example, a silicon oxide film (SiOx), a silicon nitride film (SiNx), or a multilayered structure thereof.

On the interlayer insulating film 115b, a color filter layer 106 may be disposed in the form in which one of red, green, and blue color filters is formed or two or more color filters are stacked.

A planarization layer 115c may be disposed on the color filter layer 106.

The planarization layer 115c is for planarizing a lower step, and may be formed of organic materials such as photo acryl, polyimide, a benzocyclobutene-based resin, an acrylate-based resin, or the like.

The pixel electrode 118 and the common electrode 108 may be disposed on the planarization layer 115c.

The pixel electrode 118 forms an electric field together with the common electrode 108, and liquid crystal molecules of the liquid crystal layer are tilted by the electric field formed above to display an image. The pixel electrodes 118 may be disposed at equal intervals and one ends of the plurality of pixel electrodes 118 may be connected to pixel lines disposed in the first direction. The pixel electrodes 118 may be disposed not only in the opening area, but also extended and disposed even in the non-opening area.

The common electrodes 108 may be disposed at equal intervals in parallel and one ends of the plurality of common electrodes 108 may be connected to common lines disposed in the first direction. The common electrodes 108 may be alternately disposed with the pixel electrodes 118 in the opening area.

The common electrode 108 and the pixel electrode 118 may be formed of transparent conductive films. The transparent conductive film may be, for example, a transparent and conductive material such as indium tin oxide (ITO) or indium zinc oxide (IZO). In FIGS. 7 to 10, it is illustrated that the common electrode 108 and the pixel electrode 118 are disposed on the same layer, but the present disclosure is not limited thereto. The common electrode 108 and the pixel electrode 118 may be disposed on different layers, and when the common electrode 108 and the pixel electrode 118 are disposed on different layers, for example, when the common electrode 108 is disposed on the planarization layer 115c, a second insulating film may be disposed on the common electrode 108 and the pixel electrode 118 may be disposed on the second insulating film.

In this case, according to the exemplary aspect of the present disclosure, the common electrode 108 is opened (or, is not provided) at the upper portion of the lead-out line RO1. This is because a reference voltage of the lead-out line RO1 has the same potential as the voltage of the common electrode 108, so that even if the reference voltage is removed, the parasitic capacitance may be reduced without affecting the display.

According to the exemplary aspect of the present disclosure, the lead-out line RO1 and the vertical common line AL2 are formed so as to have a narrower critical dimension D2 than a critical dimension D1 of the data line DL1 and the sensing data line Vdr1. Thus, this is because when the present disclosure is applied, lines in the data line direction, that is, the lead-out line RO1 and the vertical common line AL2 solves the problem of luminous reflection because the density of the data line DL1 and the sensing data line Vdr1 varies. That is, in order to solve this problem, the line structure of the lead-out line RO1 and the vertical common line AL2 is designed differently from that of the data line DL1. In the lead-out line RO1 and the vertical common line AL2, the shielding line 111 is removed compared with the data line DL1 and the sensing data line Vdr1 and the critical dimension D2 is decreased compared with the data line DL1 and the sensing data line Vdr1.

Next, a cross-sectional structure of the non-opening area will be described in more detail.

Figure 11:
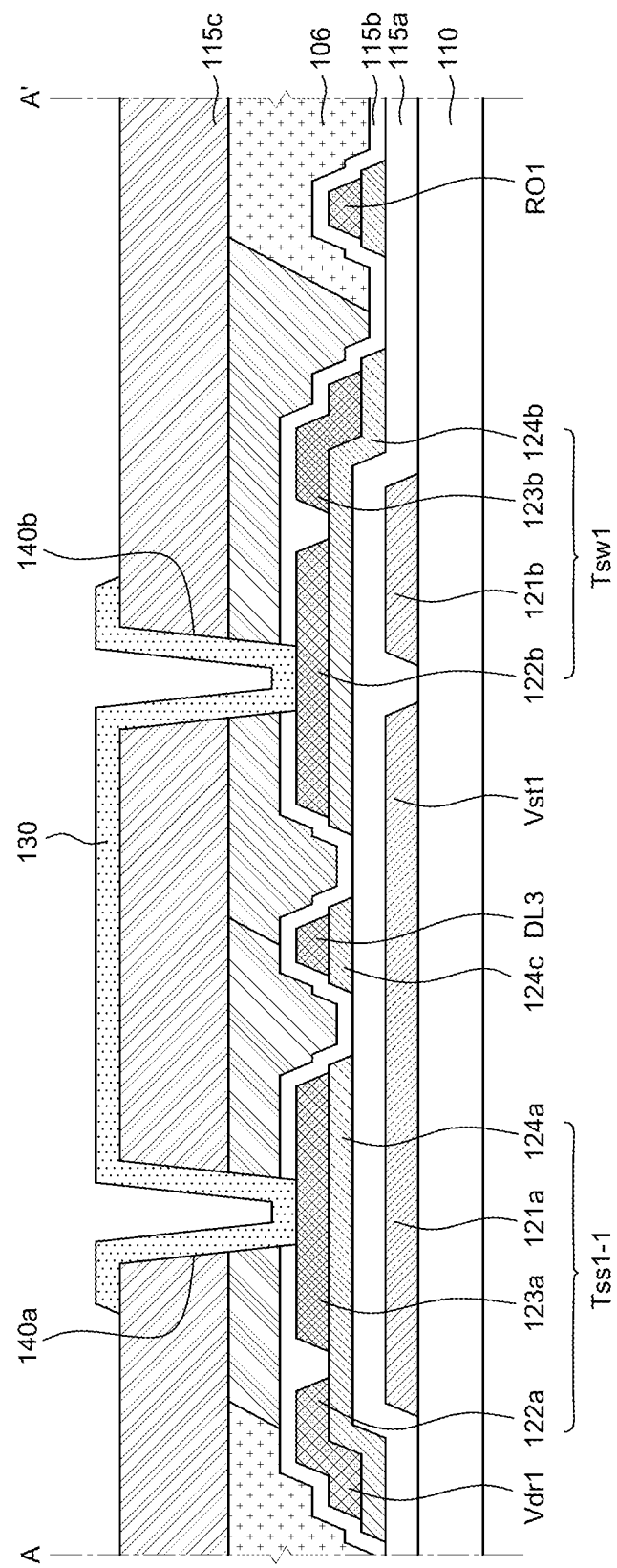
FIG. 11 is a cross-sectional view of the sensor pixel unit illustrated in FIG. 6 taken along line A-A'.

FIG. 11 is a cross-sectional view of the sensor pixel unit illustrated in FIG. 6 taken along line A-A'.

FIG. 11 illustrates an example of a cross section of the first photo touch sensor, and the second photo touch sensor may have substantially the same configuration as the first photo touch sensor.

Referring to FIG. 11, a first gate electrode 121a, a second gate electrode 121b, and a sensing storage line Vst1 may be disposed on the substrate 110.

At this time, the first gate electrode 121a and the second gate electrode 121b may be constituted by a part of the sensing storage line Vst1.

The first gate electrode 121a, the second gate electrode 121b, and the sensing storage line Vst1 may be made of the same metal material, and may be made of any one selected from the group consisting of, for example, molybdenum (Mo), aluminum (Al), chromium (Cr), gold (Au), titanium (Ti), nickel (Ni), neodymium (Nd), and copper (Cu) or an alloy thereof.

A gate insulating film 115a may be disposed on the first gate electrode 121a, the second gate electrode 121b, and the sensing storage line Vst1. The gate insulating film 115a may be formed of, for example, a silicon oxide film (SiOx), a silicon nitride film (SiNx), or a multilayered structure thereof.

A first active layer 124a, a second active layer 124b, and a semiconductor layer 124c may be disposed on the gate insulating film 115a.

The first active layer 124a, the second active layer 124b, and the semiconductor layer 124c may be made of any one of semiconductor materials such as amorphous silicon, polycrystalline silicon, low-temperature polysilicon, and an oxide semiconductor.

On the first active layer 124a, a first source electrode 122a branched from the sensing data line Vdr1 and a first drain electrode 123a spaced apart from the first source electrode 122a may be disposed. In addition, on the second active layer 124b, a second source electrode 122b and a second drain electrode 123b branched from the lead-out line RO1 may be disposed.

Further, the data line DL3 and the lead-out line RO1 may be disposed on the semiconductor layer 124c.

The first gate electrode 121a, the first source electrode 122a, the first drain electrode 123a, and the first active layer 124a may constitute the first red sensor thin film transistor Tss1-1. That is, the first source electrode 122a may become a first electrode of the first red sensor thin film transistor Tss1-1 and the first drain electrode 123a may become a second electrode of the first red sensor thin film transistor Tss1-1. Although not illustrated, the first green sensor thin film transistor may be configured substantially the same as the first red sensor thin film transistor Tss1-1.

The first red sensor thin film transistor Tss1-1 may be respond to a red light source, and the first green sensor thin film transistor may be respond to a green light source.

Further, the second gate electrode 121b, the second source electrode 122b, the second drain electrode 123b, and the second active layer 124b may constitute the first sensor switch thin film transistor Tsw1. In this case, the second source electrode 122b may become the second electrode of the first sensor switch thin film transistor Tsw1, and the second drain electrode 123b may become the first electrode of the first sensor switch thin film transistor Tsw1. Further, the second drain electrode 123b may become the lead-out line RO1.

The first source electrode 122a, the first drain electrode 123a, the second source electrode 122b, and the second drain electrode 123b may be made of any one selected from the group consisting of, for example, molybdenum (Mo), aluminum (Al), chromium (Cr), gold (Au), titanium (Ti), nickel (Ni), neodymium (Nd), and copper (Cu) or an alloy thereof.

The first and second drain electrodes 123a and 123b may extend in one direction to form a first sensor storage capacitor together with the sensing storage line Vst1 below the first and second drain electrodes 123a and 123b.

Further, the interlayer insulating film 115b may be disposed on the first source electrode 122a, the first drain electrode 123a, the second source electrode 122b, the second drain electrode 123b, the data line DL3, and the lead-out line RO1.

At this time, the interlayer insulating film 115b insulates components of an upper layer from the first source electrode 122a, the first drain electrode 123a, the second source electrode 122b, the second drain electrode 123b, the data line DL3, and the lead-out line RO1, and may be made of, for example, a silicon oxide film (SiOx), a silicon nitride film (SiNx), or a multilayer thereof.

On the interlayer insulating film 115b, a color filter layer 106 may be disposed in the form in which any one of red, green, and blue color filters may be formed or two or more color filters are stacked.

A planarization layer 115c may be disposed on the color filter layer 106.

The planarization layer 115c is for planarizing a lower step, and may be formed of organic materials such as photo acryl, polyimide, a benzocyclobutene-based resin, an acrylate-based resin, or the like.

The pixel electrode and the common electrode may be disposed on the planarization layer 115c.

Further, a connection electrode 130 may be disposed on the planarization layer 115c.

An upper portion of the first sensor storage capacitor, that is, the first drain electrode 123a is exposed to the outside through a first contact hole 140a, and an upper portion of the first sensor storage capacitor, that is, the second drain electrode 123b may be exposed to the outside through a second contact hole 140b.

Accordingly, the first drain electrode 123a is electrically connected to the connection electrode 130 through the first contact hole 140a and the second drain electrode 123b is electrically connected to the connection electrode 130a through the second contact hole 140b, so that the first drain electrode 123a and the second drain electrode 123b may be connected to each other.

The common electrode, the pixel electrode, and the connection electrode 130 may be formed of transparent conductive films. The transparent conductive film may be, for example, a transparent and conductive material such as indium tin oxide (ITO) or indium zinc oxide (IZO).

Figure 12:
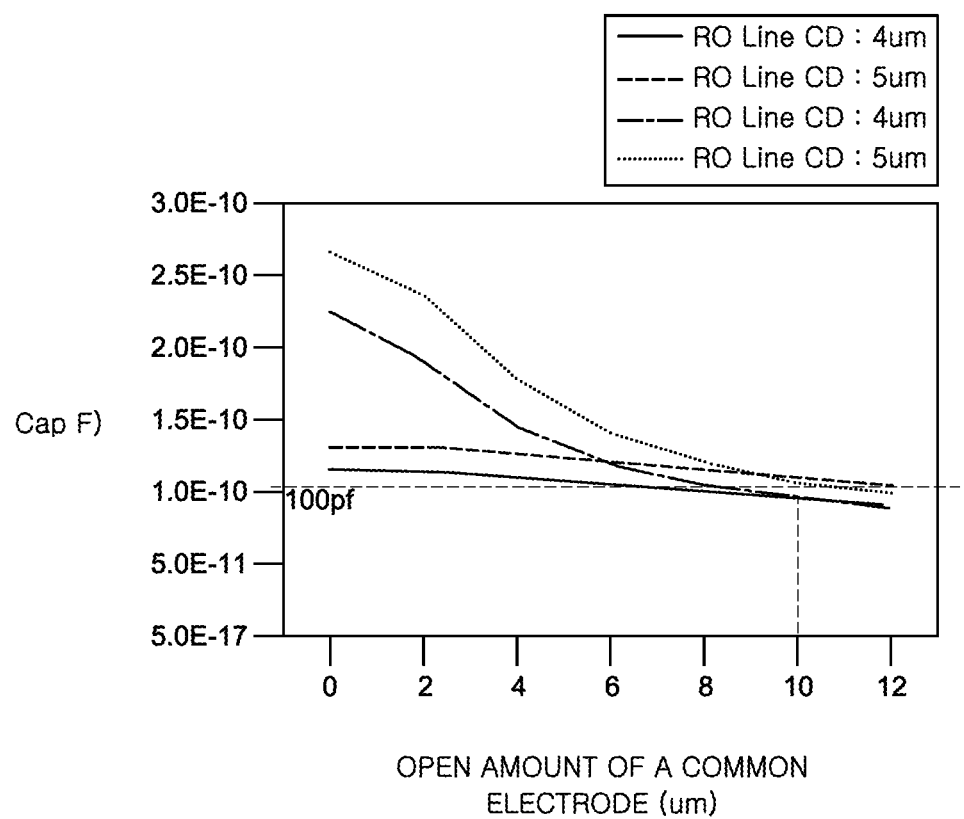
FIG. 12 is a graph illustrating an example of a parasitic capacitance according to a critical dimension of a lead-out line and an open amount of a common electrode.

FIG. 12 is a graph illustrating an example of a parasitic capacitance according to a critical dimension of a lead-out line and an open amount of a common electrode.

FIG. 12 illustrates a result of simulation obtained by measuring a parasite capacitance of a lead-out line RO according to an open amount of the common electrode by setting a critical dimension (CD) of the lead-out line RO to 4 μm or 5 μm in a 4-mask or 5-mask process.

Here, the open amount means a distance between the common electrodes at the both remaining sides after the common electrodes at the upper portion of the lead-out line RO are opened (or, are not provided).

Further, two upper graphs in FIG. 12 are for the 5-mask process, and two lower graphs are for the 4-mask process. Further, a solid-line graph represents a case where the CD of the lead-out line RO is 5 μm, and a dotted-line graph represents the case where the CD of the lead-out line RO is 4 μm.

Referring to FIG. 12, it can be seen that the size of the parasitic capacitance decreases when the CD of the lead-out line RO is reduced from 5 μm to 4 μm.

Further, it can be seen that the size of the parasitic capacitance is reduced in the case of the 5-mask process in which the active layer and the data line are formed with different masks, rather than the 4-mask process in which the active layer and the data line are formed with the same mask.

Further, when the open amount is increased, the size of the parasitic capacitance is reduced. Particularly, when the open amount is between 8 μm and 12 μm, the size of the parasitic capacitance is remarkably lowered regardless of the CD of the lead-out line RO and the mask process.

Meanwhile, in the display device according to the exemplary aspect of the present disclosure, the line for transmitting the sensor gate signal to the photo touch sensor and the gate line for applying the gate signal to the corresponding pixel are integrally disposed, so that the reduction of the aperture ratio may be minimized despite the displacement of the photo touch sensor. However, the present disclosure is not limited thereto.

The exemplary aspects of the present disclosure can also be described as follows:

According to an aspect of the present disclosure, there is provided a display device. The display device may include a plurality of gate lines disposed in a first direction; a plurality of data lines disposed in a second direction different from the first direction to define a plurality of pixels together with the plurality of gate lines; a lead-out line disposed between the data lines in the second direction; first and second photo touch sensors disposed in left and right pixels of the lead-out line and electrically connected to the lead-out line to transmit a touch sensing signal; first and second sensing data lines disposed in the second direction and applying first and second sensor data signals to the first and second photo touch sensors; and first and second sensing gate lines disposed in the first direction and applying first and second sensor gate signals to the first and second photo touch sensors.

The first and second sensing gate lines may apply the first and second gate signals to upper and lower pixels while applying the first and second sensor gate signals to the first and second photo touch sensors.

The first photo touch sensor may include a first sensor thin film transistor connected to the first sensing data line and generating a first output signal in response to a predetermined light source; a first sensor storage capacitor configured to store the first output signal outputted from the first sensor thin film transistor; and a first sensor switch thin film transistor configured to output the first output signal stored in the first sensor storage capacitor to the lead-out line in response to the first sensor gate signal.

The second photo touch sensor may include a second sensor thin film transistor connected to the second sensing data line and generating a second output signal in response to the light source; a second sensor storage capacitor configured to store the second output signal outputted from the second sensor thin film transistor; and a second sensor switch thin film transistor configured to output the second output signal stored in the second sensor storage capacitor to the lead-out line in response to the second sensor gate signal. The first sensor thin film transistor may include a first red sensor thin film transistor responding to a red light source and a first green sensor thin film transistor responding to a green light source.

The second sensor thin film transistor may include a second red sensor thin film transistor responding to a red light source and a second green sensor thin film transistor responding to a green light source.

The first and second photo touch sensors may have a mirror-symmetrical structure based on the lead-out line.

The display device may further include vertical common lines disposed between the data lines in the second direction.

The display device may further include horizontal common lines disposed on at least one side of the gate lines in the first direction.

The display device may further include an interlayer insulating film disposed at the upper portion of the first and second sensor thin film transistors, the first and second sensor storage capacitors, and the first and second sensor switch thin film transistors; a color filter layer disposed on the interlayer insulating film; a planarization layer disposed on the color filter layer; and a plurality of common electrodes and pixel electrodes disposed alternately on the planarization layer.

Some of the plurality of common electrodes may be disposed at the upper portion of the data line, the vertical common line, and the first and second sensing data lines so as to cover the data line, the vertical common line, and the first and second sensing data lines.

The display device may further include a shielding line disposed on at least one side of the data line and the first and second sensing data lines.

The common electrode may be opened at the upper portion of the lead-out line and the shielding line is not provided at one side of the lead-out line.

The lead-out line may have a critical dimension narrower than that of the data line and the first and second sensing data lines.

The shielding line may not be provided on at least one side of the vertical common line.

The vertical common line may have a critical dimension narrower than that of the data line and the first and second sensing data lines.

According to another aspect of the present disclosure, there is provided a display device. The display device may include a lead-out line disposed between data lines in one direction; first and second photo touch sensors electrically connected to the lead-out line at left and right sides of the lead-out line; first and second sensing data lines disposed in the one direction and applying first and second sensor data signals to the first and second photo touch sensors; and first and second sensing gate lines disposed in the other direction and applying first and second sensor gate signals to the first and second photo touch sensors, wherein a charge stored in the first and second photo touch sensors may be transmitted to the lead-out line during one sensing timing.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
   a plurality of gate lines disposed in a first direction;
   a plurality of data lines disposed in a second direction different from the first direction and defining a plurality of pixels with the plurality of gate lines; and
   a sensor pixel unit comprising:
   a lead-out line disposed between the plurality of data lines in the second direction;
   first and second photo touch sensors disposed in left and right sides of the lead-out line and electrically connected to the lead-out line and transmitting a touch sensing signal;
   first and second sensing data lines disposed in the second direction and applying first and second sensor data signals to the first and second photo touch sensors; and
   first and second sensing gate lines disposed in the first direction and applying first and second sensor gate signals to the first and second photo touch sensors while applying the first and second sensor gate signals to upper and lower pixels.

2. The display device of claim 1, wherein the first photo touch sensor comprises:
   a first sensor thin film transistor connected to the first sensing data line and generating a first output signal in response to a predetermined light source;
   a first sensor storage capacitor configured to store the first output signal outputted from the first sensor thin film transistor; and
   a first sensor switch thin film transistor configured to output the first output signal stored in the first sensor storage capacitor to the lead-out line in response to the first sensor gate signal.

3. The display device of claim 2, wherein the second photo touch sensor comprises:
   a second sensor thin film transistor connected to the second sensing data line and outputting a second output signal in response to the light source;
   a second sensor storage capacitor configured to store the second output signal outputted from the second sensor thin film transistor; and
   a second sensor switch thin film transistor configured to output the second output signal stored in the second sensor storage capacitor to the lead-out line in response to the second sensor gate signal.

4. The display device of claim 3, wherein the second sensor thin film transistor comprises:
   a second red sensor thin film transistor responding to a red light source; and
   a second green sensor thin film transistor responding to a green light source.

5. The display device of claim 3, further comprising vertical common lines disposed between the data lines in the second direction.

6. The display device of claim 5, further comprising:
   an interlayer insulating film disposed at an upper portion of the first and second sensor thin film transistors, the first and second sensor storage capacitors, and the first and second sensor switch thin film transistors;
   a color filter layer disposed on the interlayer insulating film;
   a planarization layer disposed on the color filter layer; and
   a plurality of common electrodes and pixel electrodes disposed alternately on the planarization layer.

7. The display device of claim 6, wherein a part of the plurality of common electrodes is disposed at the upper portion of the data line, the vertical common line, and the first and second sensing data lines and covers the data line, the vertical common line, and the first and second sensing data lines.

8. The display device of claim 7, further comprising a shielding line disposed on at least one side of the data line and the first and second sensing data lines.

9. The display device of claim 7, wherein the common electrode is opened at the upper portion of the lead-out line and the shielding line is not disposed at one side of the lead-out line.

10. The display device of claim 9, wherein the lead-out line has a critical dimension narrower than that of the data line and the first and second sensing data lines.

11. The display device of claim 7, wherein the shielding line is not provided on at least one side of the vertical common line.

12. The display device of claim 11, wherein the vertical common line has a dimension narrower than that of the data line and the first and second sensing data lines.

13. The display device of claim 2, wherein the first sensor thin film transistor comprises:
   a first red sensor thin film transistor responding to a red light source; and
   a first green sensor thin film transistor responding to a green light source.

14. The display device of claim 1, wherein the first and second photo touch sensors have a mirror-symmetrical structure with respect to the lead-out line.

15. The display device of claim 1, further comprising horizontal common lines disposed on at least one side of the gate lines in the first direction.

16. A display device including a sensor pixel unit comprising:

a lead-out line disposed between a plurality of data lines in a first direction;

first and second photo touch sensors electrically connected to the lead-out line at left and right sides of the lead-out line;

first and second sensing data lines disposed in the one direction and applying first and second sensor data signals to the first and second photo touch sensors; and first and second sensing gate lines disposed in a second direction and applying first and second sensor gate signals to the first and second photo touch sensors while applying the first and second sensor gate signals to upper and lower pixels, wherein a charge stored in the first and second photo touch sensors is transmitted to the lead-out line during one sensing timing.

17. The display device of claim 16, wherein the first photo touch sensor comprises:

a first sensor thin film transistor connected to the first sensing data line and generating a first output signal in response to a predetermined light source;

a first sensor storage capacitor configured to store the first output signal outputted from the first sensor thin film transistor; and a first sensor switch thin film transistor configured to output the first output signal stored in the first sensor storage capacitor to the lead-out line in response to the first sensor gate signal.

18. The display device of claim 17, wherein the second photo touch sensor comprises:

a second sensor thin film transistor connected to the second sensing data line and outputting a second output signal in response to the light source;

a second sensor storage capacitor configured to store the second output signal outputted from the second sensor thin film transistor; and a second sensor switch thin film transistor configured to output the second output signal stored in the second sensor storage capacitor to the lead-out line in response to the second sensor gate signal.

* * * * *